United States Patent [19]

Jarvis et al.

[11] Patent Number: 5,441,999
[45] Date of Patent: Aug. 15, 1995

[54] HOT MELT ADHESIVE

[75] Inventors: Neil R. Jarvis, Brantford, Canada; Anil B. Goel, Naperville, Ill.

[73] Assignee: Reichhold Chemicals, Inc., Durham, N.C.

[21] Appl. No.: 137,599

[22] Filed: Oct. 15, 1993

[51] Int. Cl.$^6$ .............................................. C08L 91/00
[52] U.S. Cl. .................................... 524/271; 524/489
[58] Field of Search ...................... 281/21.1; 412/1, 8; 524/304, 271, 489; 523/514; 428/513

[56] References Cited

U.S. PATENT DOCUMENTS

| | | | |
|---|---|---|---|
| 3,644,267 | 2/1972 | Jackson, Jr. et al. | 523/514 |
| 3,900,694 | 8/1975 | Jurrens | 428/513 |
| 4,140,733 | 2/1979 | Meyer, Jr. et al. | 524/304 |
| 4,369,135 | 1/1983 | Morgan et al. | |
| 4,659,785 | 4/1987 | Nagano et al. | |
| 4,660,858 | 4/1987 | Flanagan | 281/21.1 |

Primary Examiner—Hwei-Siu Payer
Attorney, Agent, or Firm—Bell, Seltzer, Park & Gibson

[57] ABSTRACT

The foregoing and other objects and advantages of the present invention are accomplished by a hot melt adhesive comprising a blend of a low molecular weight polyolefin, olefin-carboxylic acid graft polymer or olefin-maleic anhydride graft polymer or blend thereof; a propylene-ethylene copolymer or propylene-ethylene-butene terpolymer; and a tackifying resin or blend of tackifying resins. The blend can include an antioxidant or blends of antioxidants, a high molecular weight or functionalized polyolefin or a copolymer or terpolymer of a vinyl monomer (e.g., ethylene/vinyl acetate).

10 Claims, No Drawings

HOT MELT ADHESIVE

FIELD AND BACKGROUND OF THE INVENTION

The present invention relates to a hot melt adhesive. More particularly, the invention relates to an adhesive which has desirable adhesive properties and which facilitates recycling cellulosic (e.g., paper) products having the adhesive thereon.

Hot melt and pressure sensitive adhesives for cellulosic products are typically water insoluble and thus are difficult to remove during recycling such as during a repulping process. The repulping process typically comprises mixing water and paper, and the fibers are separated via mechanical action. The slurry may then be passed through screens and centrifugal cleaners to remove non-fibrous contaminants such as glass, metal, plastic, dirt, and other unwanted solid materials. After waste paper is repulped, it is formed into paper or paper board on the moving wire of a fourdrinier machine or on the cylinders of a cylinder machine, pressed and dried to remove the remaining water.

The failure to remove all of the water insoluble adhesive from the repulped paper results in papers of low quality, inconsistent composition, and non-uniform appearance and surfaces. Additionally, the sticky nature of the adhesive can create processing difficulties in commonly used automated machinery. Both of these problems are due to the fact that the adhesives tend to agglomerate and form globules commonly called "stickies."

Various solutions to the problem associated with hot melt and pressure sensitive adhesives have been suggested. For example, U.S. Pat. No. 3,891,584 to Ray-Chaudhuri et al. proposes a water dispersible hot melt adhesive comprising 75 to 95 parts of a graft copolymer of vinyl monomer and a water soluble polyalkylene oxide polymer, and 5 to 25 parts of a tackifying resin. U.S. Pat. No. 4,176,054 to Kelley proposes providing the adhesive with a magnetic or paramagnetic material integrated therein. These solutions have not, however, been widely embraced by the industry due to cost and unacceptable adhesive properties of the resulting hot melt adhesive.

It is therefore an object of the present invention to provide a hot melt adhesive which facilitates the recycling of cellulosic products bearing the adhesive.

Still another object of the present invention is to provide a hot melt adhesive which obviates the problems associated with the formation of stickies during recycling.

Another object of the invention is to provide a hot melt adhesive which is characterized by aggressive tack and good machining properties.

SUMMARY OF THE INVENTION

The foregoing and other objects and advantages of the present invention are accomplished by a hot melt adhesive comprising a blend of a low molecular weight (i.e., less than about 50,000) polyolefin, olefin-carboxylic acid graft polymer or olefin-maleic anhydride graft polymer or blends thereof; a propylene-ethylene copolymer or propylene-ethylene-butene terpolymer; and a tackifying resin or blend of tackifying resins. The hot melt adhesive blend can include an antioxidant or blend of antioxidants, a high molecular weight polyolefin, a functionalized polyolefin (e.g., an ethylene vinyl silane copolymer), or a copolymer or terpolymer of a vinyl monomer (e.g., ethylene/vinyl acetate).

The hot melt adhesive of the present invention can be used for example in packaging and bookbinding, and particularly in perfect bound books. Perfect binding is the term used to describe a method of book binding in which the sheets making up a book are stacked in order to form a so-called signature which is then held in a clamp while adhesive is applied to the edge or spine to be bound whereafter a cover sheet or strip is brought into contact with the spine before the adhesive sets. Perfect binding originally was used as a cheap and rapid binding method for paperback or pocket books. However, it is now used for binding magazines, catalogues, directories, etc., and even for binding signatures for case-bound books.

The adhesive advantageously can be formed into a thin film in the molten state, wet easily and provides good tack on papers such as coated paper, enameled stock, cross and long grain, coated or uncoated sheets and ground wood. The adhesives of the present invention are quick setting and can be used in a wide range of viscosities. The adhesive of the present invention provides good mechanical properties such as high bonding strength, flexibility, high tensile strength, and resistance to aging, mold growth and cold crack. Cellulosic products with the adhesive thereon can be recycled by repulping inasmuch as the adhesive of the present invention does not form stickies at elevated temperatures.

DETAILED DESCRIPTION OF THE INVENTION

As stated above the hot melt adhesive of the present invention is suitable for use with cellulosic products which can be repulped to recycle. The hot melt adhesive comprises a low molecular weight polyolefin, olefin-carboxylic acid graft polymer or olefin-maleic anhydride graft polymer or blends thereof; a propylene-ethylene copolymer or propylene-ethylene-butene terpolymer; and a tackifying resin or blend of tackifying resins.

The low molecular weight polyolefin is preferably polyethylene, polypropylene or polybutylene and has a molecular weight of less than about 50,000, and typically from about 2,000 to 50,000. The olefin-carboxylic acid graft polymer preferably is a graft polymer of ethylene or propylene and a carboxylic acid having 1 to 6 carbon atoms such as acrylic acid or methyacrylic acid. The olefin-maleic anhydride graft polymer preferably is a graft polymer of ethylene or propylene and maleic anhydride. Selection of various graft polymers and polymerization techniques will be within the skill of one in the art.

The propylene ethylene copolymers and the propylene-ethylene-butene terpolymers are formed using conventional copolymerization techniques.

The tackifying resin is a low molecular weight (i.e., from about 500 to 25,0000) polymer resin that is used to provide hot tack and adhesion, and can control compatibility with other polymeric components. Exemplary tackifying resins include aliphatic hydrocarbons, aromatic hydrocarbons, aromatic/aliphatic hydrocarbons, dimerized rosin, pentaerythritol esters of rosin, glycerol esters of rosin, hydrogenated pentaerythritol rosin esters, styrenated terpenes, rosin acids, styrene based resins, polyterpenes, phenolic modified terpenes, and styrene-modified hydrocarbons and blends thereof such as described in U.S. Pat. Nos. 4,140,733 to Meyer, Jr. et al. and 4,722,650 to Allen et al., the disclosures of which are incorporated herein by reference in their entirety.

The composition is formed batchwise (single stage) by blending the components under conditions sufficient to form the hot melt adhesive. Typically, the low molecular weight polyolefin, olefin-carboxylic acid graft polymer or olefin-maleic anhydride graft polymer and the tackifying resin or blend of tackify resin are mixed in a kettle jacket at a temperature of about 150° C. to 200° C. Any antioxidants, stabilizers, compatibilizers and catalysts are added and heated to 150° C. to 200° C. until all the ingredients are molten. Mixing is commenced and heat is applied to maintain a temperature of about 160° C. to 180° C. The propylene-ethylene copolymer or propylene-ethylene-butene terpolymer is added while maintaining the temperature at about 160° C. to 180° C. The entire mixture is then homogeneously blended at a temperature of about 160° C. to 180° C. The resulting composition typically has a viscosity of about 500 to 10,000 cps at 175° C., a softening point of about 130° C. to 165° C. and a maximum cold crack of at least +5° C. Other manufacturing techniques include continuous feed extrusion, sequential polymerization or by blending batch polymers, the selection and operation of these techniques will be within the skilled of one in the art.

The hot melt adhesive can optionally include a high molecular weight polyolefin such as polyethylene or polypropylene having a molecular weight greater than about 50,000, and often greater than about 100,000. The hot melt adhesive could also include a copolymer or terpolymer of a vinyl monomer, e.g., an ethylene-vinyl acetate (EVA) copolymer such as described in U.S. Pat. Nos. 3,615,106 to Flanagan et al., 4,140,733 to Meyer, Jr. et al. and 4,960,295 to Bodouroglou, the disclosures of which are incorporated herein in their entirety. The hot melt adhesive could also include a functionalized polyolefin such as an ethylene vinyl silane copolymer. Such a copolymer can be crosslinked using moisture which contributes to the copolymer being non-disintegradable.

The hot melt adhesive can include an antioxidant or blend of antioxidants. Suitable antioxidants are high molecular weight hindered phenols and multifunctional phenols, amines and phosphites such as sulfur and phosphorous-containing phenols. Hindered phenols are well known to those skilled in the art and are described in U.S. Pat. Nos. 4,660,858 to Flanagan et al. and 4,140,733 to Allen, Jr. et al., the disclosures of which are incorporated herein by reference in its entirety. The hindered phenols may be characterized as phenolic compounds which also contain sterically bulky radicals in close proximity to the phenolic hydroxyl group thereof. In particular, tertiary butyl groups generally are substituted onto the benzene ring in at least one of the other positions relative to the phenolic hydroxy group. The presence of these sterically bulky substituted radicals in the vicinity of the hydroxyl group serves to retard its stretching frequency and, correspondingly, its reactivity; this steric hindrance thus providing the phenolic compound with its stabilizing properties. Representative hindered phenols include: butylhydroxyphenol ("BHT"); 4,4'-bis($\alpha\alpha$-dimethylbenzyl) diphenylamine; 1,3,4-trimethyl 2,4,6-tris (3,5-di-tertbutyl-4-hydroxybenzyl)benzene; 2,2'-thiodiethyl-bis (3,5-di-tertbutyl-4-hydroxyhydrocinnamate); pentaerythrityl tetrakis-3(3,5-di-tertbutyl-4-hydroxybenzyl) propionate; n-octadecyl-3(3,5-di-tertbutyl-4-hydroxphenyl)propionate; 4,4'-methylenbis(2,6-tert-butylphenol); 4,4'-thiobis (6-tertbutyl-o-cresol); 2,6-di-tertbutylphenol; 6-(4-hydroxyphenoxy)-2,4-bis(n-octylthio)-1,3,5-triazine; di-n-octadecyl 3,5-di-tert-butyl-4-hydroxybenzoate; and sorbitol hexa[3-(3,5-di-tert-butyl-4-hydroxyphenyl) propionate].

The performance of these antioxidants may be further enhanced by utilizing, in conjunction therewith, known synergists such as, for example thiodipropionate esters and phosphites; particularly useful is distearylthiodipropionate. Antioxidants and blends of antioxidants, if used, are generally present in amounts of about 0.1 to 2.0 weight percent by weight, and preferably about 0.25 to 1.0 percent by weight.

The adhesive can also include components such as diluents or modifiers in the form of various waxes. As will be understood by those skilled in the art, the inclusion of waxes in the formulations reduces viscosity, enhances hot melt processing, influences the open time of the particular adhesive formulation and regulates the heat resistance of the bound book. Waxes which are suitable for inclusion in hot melt formulations include oxidized waxes, oxidized polyethylene, high melting point microcrystalline waxes, 40° C. to 70° C. paraffins, synthetic waxes, and the like. Wax modifiers or low molecular weight polymers may also be added in small percentages. The waxes included are most preferably high melting point microcrystalline and/or synthetic waxes. The adhesive will preferably contain between about 10 and about 30 percent by weight and, most preferably, between about 15 and about 20 percent by waxes.

The hot melt adhesive of the invention can be utilized with various cellulosic materials. The adhesive can be used in packaging and bookbinding. For example, in bookbinding, the hot melt adhesive is particularly adapted for use in perfect bound books. This technique is used for binding magazines, catalogues, directories (e.g., telephone books) and the like. Such books create a great source of waste and represent a major prospect for recycling via repulping techniques.

Generally, a perfect bound book, such as described in U.S. Pat. No. 4,960,295 to Bodouroglou, comprises a plurality of sheets forming a book block. These sheets are stacked in order to form a so-called "signature" which is then held in a clamp while adhesive is applied to the edge or spine to be bound whereafter a cover sheet or strip is brought into contact with the spine before the adhesive sets. The book block has a backbone of the hot melt adhesive. The book block can optionally include a primer layer based on allow viscosity water-based vinyl acetate-ethylene (VAE) emulsion such as described in the Bodouroglou patent.

The process of binding the perfect bound book is typically a so-called "one-shot" operation although a so-called "two-shot" technique can be used if the optional primer layer is applied to the book block. In operation, the process comprises applying the hot melt adhesive of the present invention to the book block, and subjecting the hot melt adhesive to conditions sufficient to solidify the adhesive to bind the perfect bound book. Typically, the adhesive is applied at a temperature of about 170° C. and 190° C., and is set by cooling to less than about 165° C.

EXAMPLES

Example 1

A hot melt adhesive is prepared by following the procedures described below. A clean kettle, equipped with a mechanical mixer and heated to 150° C., is charged with approximately 20 parts of (A) hydrogenated $C_5$ aliphatic hydrocarbon tackifying resin with 130° C. ring and ball softening point (Brookfield viscosity of 1200 cps at 190° C.); (B) 0.5 parts of butyl-hydroxyphenol; (C) 0.3 parts of 2,2' thiodiethyl-bis (3,5 di-tert-butyl-4-hydroxyhydrocinnamate), and (D) 2 parts of 4,4'-bis($\alpha\alpha$-dimethylbenzyl) diphenylamine. It is mixed thoroughly, followed by the addition of 10 parts of (E) maleic anhydride grafted polyethylene (106° C. softening point, m.w.=26,000/m.w.=5,600); 15 parts of (F) maleic anhydride grafted polypropylene (157° C. softening point); and 55 parts of (G) propylene-ethylene-butene terpolymer (softening point 155° C., m.w., 45,000). The mixture is continued to mix at 175°±10° C. for about 2 hours until a homogeneous solution is obtained. The resulting hot melt adhesive has a viscosity of 5,000 cps at 175° C., and softening point of 155° C. The hot melt adhesive is used as a one-shot bookbinding adhesive exhibiting a page pull value of >35 lbs, page flex of >75, and cold crack of <0° C.

Example 2

A telephone directory, ¾ of an inch thick, bound using the hot melt adhesive in Example 1, is subjected to repulping using the following procedure. The spine of the telephone directory is cut to make the total width of the directory about ¼" from the glue line. This is further cut into pieces ⅜" to ½ in width. About 10 pieces of such paper cuts containing adhesive film, each weighing about 1 gram, are mixed with 50 grams of blotting paper, thus making 60 grams of total paper, and placed in a disintegrator. Two liters of tap water is added to the disintegrator and the temperature is maintained at 55°±5° C. The disintegrator is run for about 30,000 revolutions (about 10 minutes). At the end of the blending cycle, the sample is diluted with an additional 4 liters of water (25° C.). The slurry is filtered to remove the hot melt adhesive. The hot melt adhesive thereby screened is examined for breakage or disintegration of the adhesive film. It is found that all the adhesive pieces are intact within the same dimension (unchanged). The 100 ml pulped slurry is used for hand sheet machine and subjected to high temperature evaluation (about 120° C.) between two Kraft papers to determine the formation of any stickies. From this test, no glue is observed thus confirming that the adhesive does not disintegrate under the disintegration (repulping) process.

Example 3

This example demonstrates that the hot melt adhesive of the present invention can include a polyolefin such as polyethylene and atactic polypropylene. The procedure followed uses 10 parts of maleic hydride grafted polypropylene (F) from Example 1, 20 parts of hydrogenated $C_5$ aliphatic hydrocarbon tackifying resin (A), 30 parts of polyethylene polymer, and 40 parts of atactic polypropylene. In addition to this the same level of antioxidants package (i.e., components (B) to (D)) as reported in Example 1 is included. The resulting hot melt adhesive, with a softening point of 155° C. and viscosity of 4,600 cps at 175° C., was found to be suitable as a bookbinding adhesive. The product is found to pass the pulping and stickies tests.

Example 4

The example demonstrates that one can use a small amount of wax as an additive in the hot melt adhesive of Example 1 without significantly affecting the properties. The procedure of Example 1 is produced using 15 parts of tackifying resin (A), 10 parts of (F), 45 parts of (G), 25 parts of polyethylene polymer, and 5 parts of polyethylene wax (drop melting point=115°±2° C.; m.w.=700 to 1200). The antioxidant package of Example 1 is used. The resulting hot melt adhesive passed the repulping and stickies test, and had the adhesive performance satisfactory for bookbinding applications.

Example 5

This example demonstrates the properties of a hot melt adhesive which could be used in packaging applications (for example, case and carton sealing). The procedure of Example 1 was followed using about 15 parts of aliphatic hydrocarbon tackifying resin (A), 15 parts of pentaerythritol resin ester, 13 parts of maleic anhydride grafted polyterpene (F), 49.5 parts of propylene-ethylene copolymer (141° C. softening point), and 0.5 parts of a hindered phenol antioxidant (C). The resulting product had a viscosity of 3,000 cps at 175° C., softening point of 140° C., and cold crack below 5° C. The product was found to be suitable as a packaging adhesive in terms of open time (<5 sec), and set speed (<2 sec). The adhesive was found to pass the repulping and stickies test as described in Example 2.

Comparative Example 1

This is a comparative example using a conventional hot melt adhesive for bookbinding application based on an EVA polymer. In a typical example, the hot melt is prepared by blending a mixture of 25.7 parts of paraffin wax (melting point=58° C. to 60° C.), 30.7 parts of $\alpha$-methylstyrene hydrocarbon resin (melting point=80° C. to 90° C.), 33.8 parts of EVA polymer (33 percent vinyl acetate; melt index=43), and 9.9 parts of EVA polymer (28 percent vinyl acetate; melt index=40). The resulting hot melt adhesive has a softening point of 80°±2° C. and viscosity of 3599 ±500 cps at 177° C. This adhesive was used as a bookbinding adhesive and subjected to the repulping test of Example 2. The result was formation of stickies and the adhesive tended to disintegrate in the repulping test causing blockage of filters.

Comparative Example 2

This was a comparative example for packaging application using a polyethylene polymer along with tackifying resins without the use of maleic anhydride grafted polyolefin and copolymers or terpolymers. In a typical example, a hot melt adhesive is prepared using 66.3 parts of a low density polyethylene polymer (melting point =104° C.; melt index=2250), 2 parts of low density polyethylene (melting point =110° C.; melt index=200), 15 parts hydrocarbon tackifying resin (A) of Example 1, 16.2 parts of another hydrocarbon tackifying resin and softening point of 115° C. and viscosity of 400 cps at 150° C., 0.3 parts of antioxidant (C) of Example 1, and 0.2 parts of amine antioxidant (D) of Example 1. The resulting hot melt adhesive has a softening point of 97°±3° C. and a viscosity of 2000 ±400 cps at 177° C. Although the adhesive was suitable for packaging and is being used commercially, when subjected to the repulping conditions of Example 2, results were the break-up of the adhesive and formation of stickies.

While various embodiments have been disclosed and described herein, it will be appreciated that various changes and modifications can be made by those skilled in the art without departing from the true spirit and scope of the invention, as defined in the following claims.

That which is claimed is:

1. A hot melt adhesive, comprising a blend of
   (a) 5 to 20 weight percent low molecular weight polyolefin, olefin-carboxylic acid graft polymer or olefin-maleic anhydride graft polymer or blends thereof;
   (b) 40 to 70 weight percent propylene-ethylene-butene terpolymer;
   (c) 10 to 40 weight percent tackifying resin or blend of tackifying resins; and
   (d) 0.1 to 2.0 percent antioxidant or blend of antioxidants.

2. The hot melt adhesive according to claim 1 wherein the tackifying resin is selected from the group consisting of aliphatic hydrocarbons, aromatic hydrocarbons, aromatic/aliphatic hydrocarbons, dimerized rosin, pentaerythritol esters of rosin, glycerol esters of rosin, hydrogenated pentaerythritol rosin esters, styrenated terpenes, rosin acids, styrene based resins, polyterpenes, phenolic modified terpenes, and styrene-modified hydrocarbons.

3. The hot melt adhesive according to claim 1 wherein the low molecular weight polyolefin is polyethylene, polypropylene or polybutylene and has a molecular weight of less than about 50,000 and the olefin-maleic anhydride graft polymer is an ethylene-maleic anhydride or propylene-maleic anhydride graft polymer.

4. The hot melt adhesive according to claim 1 wherein the antioxidant is a high molecular weight hindered phenol or a multifunctional phenol, amine or phosphite, or blends thereof.

5. The hot melt adhesive according to claim 1 wherein said adhesive further comprises a high molecular weight or functionalized polyolefin or a copolymer or terpolymer of a vinyl monomer.

6. The hot melt adhesive according to claim 5 wherein the high molecular weight polyolefin is polyethylene or polypropylene having a molecular weight of greater than about 50,000.

7. The hot melt adhesive according to claim 5 wherein the copolymer of a vinyl monomer is an ethylene-vinyl acetate copolymer.

8. The hot melt adhesive according to claim 5 wherein the functionalized polyolefin is an ethylene vinyl silane copolymer.

9. The hot melt adhesive according to claim 1 wherein said adhesive further comprises a wax.

10. The hot melt adhesive according to claim 9 wherein the wax is a polyethylene wax.

* * * * *

UNITED STATES PATENT AND TRADEMARK OFFICE
CERTIFICATE OF CORRECTION

PATENT NO. : 5,441,999
DATED : August 15, 1995
INVENTOR(S) : Jarvis et al.

It is certified that error appears in the above-indentified patent and that said Letters Patent is hereby corrected as shown below:

On the title page, the attached references should be added.

column 1, line 20-21, "paper board" should be --paperboard--.

column 2, line 49 "to" should be omitted.

line 59, "25,0000" should be --25,000--.

column 3, line 9, change "tackify" to --tackifying--.

line 25, insert --and-- before "the".

line 26, change "skilled" to --skill--.

line 50, "Allen" should be --Meyer--.

column 4, line 14, omit "weight" (first occurrence).

line 35 change "waxes" to --weight--.

UNITED STATES PATENT AND TRADEMARK OFFICE
CERTIFICATE OF CORRECTION

PATENT NO. : 5,441,999

DATED : August 15, 1995

INVENTOR(S) : Jarvis et al.

It is certified that error appears in the above-indentified patent and that said Letters Patent is hereby corrected as shown below:

References to be added:

| | | | | |
|---|---|---|---|---|
| 3,597,264 | 8/1971  | Sirota              | 117 | 122S  |
| 3,615,106 | 10/1971 | Flanagan et al.     | 281 | 21    |
| 3,691,140 | 9/1972  | Silver              | 260 | 78.5  |
| 3,720,633 | 3/1973  | Nickerson           | 260 | 17.4  |
| 3,891,584 | 6/1975  | Ray-Chaudhuri et al.| 260 | 27R   |
| 4,176,054 | 11/1979 | Kelley              | 209 | 8     |
| 4,345,349 | 8/1982  | Flanagan            | 412 | 5     |
| 4,371,194 | 2/1983  | Wang et al.         | 281 | 21R   |
| 4,371,195 | 2/1983  | Wang et al.         | 281 | 21R   |
| 4,408,780 | 10/1983 | Detterman et al.    | 281 | 15R   |
| 4,463,120 | 7/1984  | Collins et al.      | 524 | 274   |
| 4,495,318 | 1/1985  | Howard              | 524 | 375   |
| 4,526,642 | 7/1985  | Caughey             | 156 | 311   |
| 4,536,012 | 8/1985  | Hume, III           | 281 | 21R   |
| 4,564,649 | 1/1986  | Hume, III et al.    | 524 | 13    |
| 4,608,111 | 8/1986  | Hume, III et al.    | 156 | 306.6 |
| 4,702,496 | 10/1987 | Hume, III           | 281 | 15R   |
| 4,712,808 | 12/1987 | Beh-Forrest et al.  | 281 | 15R   |
| 4,722,650 | 2/1988  | Allen et al.        | 412 | 3     |
| 4,728,688 | 3/1988  | Tizzard et al.      | 524 | 504   |
| 4,810,763 | 3/1989  | Mallya et al.       | 526 | 203   |
| 4,871,803 | 10/1989 | Zimmel et al.       | 525 | 89    |
| 4,960,295 | 10/1990 | Bodouroglou         | 281 | 15.1  |
| 5,071,914 | 12/1991 | Zimmel et al.       | 525 | 113   |
| 5,098,962 | 3/1992  | Bozich              | 525 | 437   |
| 5,196,504 | 3/1993  | Scholz et al.       | 526 | 318.4 |

UNITED STATES PATENT AND TRADEMARK OFFICE
CERTIFICATE OF CORRECTION

PATENT NO. : 5,441,999
DATED : August 15, 1995
INVENTOR(S) : Jarvis et al.

It is certified that error appears in the above-indentified patent and that said Letters Patent is hereby corrected as shown below:

```
column 5, line 19, omit space before "G".
         line 35, "1/2" should be 1/2"--.
         line 39, change "is" to --are--.
```

Signed and Sealed this

Eighth Day of October, 1996

Attest:

BRUCE LEHMAN

*Attesting Officer*   *Commissioner of Patents and Trademarks*